3,492,201
METHOD OF ATTENUATION OF HOG CHOLERA VIRUS
Masao Soekawa, Matsudo-shi, and Hisao Izawa, Kawasaki-shi, Japan, assignors to The Kitasato Institute, Tokyo, Japan, a corporation of Japan
No Drawing. Filed Mar. 6, 1967, Ser. No. 620,609
Int. Cl. C12k 7/00
U.S. Cl. 195—1.3          2 Claims

ABSTRACT OF THE DISCLOSURE

A method of attenuation of hog cholera virus by mincing kidneys or the other organs or tissues of pigs which have been artificially infected with a virulent strain of hog cholera virus, treating for one night the minced fragment with a NaCl buffer solution containing trypsin, mono layer culturing at 36°–37° C. and serial cell passaging more than 50 times.

---

This invention consists of attenuation of hog cholera virus (HCV) by the use of serial cell passages of the virus-carrier mono-layer culture derived from the kidneys or the other organs (or tissues) of pig artificially infected with a virulent strain of the virus. The attenuation of virulence of the persisted HCV markedly progresses by increasing the number of serial cell passages. The serial cell passages result in the establishment of HCV-carrier cell strain which becomes a stable source of the attenuated HCV. Accordingly, following the method, it is readily possible to develop an attenuated hog cholera virus vaccine.

Hog cholera is a disease of swine which is well known and most dreadful as the cause of great economical damages to swine industry in a variety of countries. As one of practical means for the prevention of the disease, hog cholera vaccine consisting of either killed or live virus has been widely employed.

Crystalviolet vaccine, a typical killed-virus vaccine, has been evaluated for its safety and potency. However, large doses for obtaining a solid immunity, and slow development and short duration of the immunity are pointed out as the defects of the vaccine. In addition, the vaccine costs rather dear because of its source, the defibrinated whole blood of infected pigs. The defects of the vaccine could be reduced by using live-virus vaccine. Certain live-virus vaccines, however, a lapinized virus for example, are viewed with apprehension as to their virulence.

The most ideal virus vaccine should be attenuated virus, because, perfect vaccine must be safe in every way, and capable of producing solid and long life immunity which rapidly develops with small dose of inoculum. This is satisfied only by a safe attenuated-virus vaccine. In addition, price could be reduced by introducing tissue culture method for preparing the vaccine.

There have been a number of attempts to obtain attenuated HCV, by employing tissue culture methods. A majority of these attempts started with the inoculation of HCV on to cultures prepared from healthy animals. Contrarily, the method designed by us started with cultivation of monolayer cultures derived from the kidneys, spleen and the other organs (or tissues) of pigs with experimental hog cholera. Then the infected monolayer cultures were serially passaged for obtaining HCV-carrier cell strains. The carried virus was found to be attenuated as the serial cell passages proceeded. The discovery by us, the essence of the invention, is characterized in the uniqueness of our method for the virus attenuation. Example of the method is described below.

Example

Yorkshire pigs, healthy, highly susceptible to HCV and raised in an isolated and closed ranch with sound health program, were inoculated with a virulent strain of HCV. The strain is a standard challenge virus and has been strictly maintained with precautions for bacterial and viral contaminations. At the peak of the infection, the pigs were bled to death and the kidneys were removed aseptically. The kidneys were minced into small fragments and stirred 4° C. overnight to disperse the cells with a phosphatic buffered saline (PBS)) containing 0.25% trypsin and 0.25% pancreatin (by weight). Dispersed cells were collected, rinsed and resuspended in a nutrient medium at concentration of $5 \times 10^5$ cells per ml. The cell suspension was dispensed into glass vessels and incubated stationary at 36–37° C. The cells attached to glass wall formed confluent monolayer cell sheet.

After the completion of the cell sheet, the sheet was again dispersed with PBS containing 0.1% by weight of trypsin and 0.1% by weight of EDTA. The dispersed cells were then collected, rinsed and suspended in a nutrient medium at concentration of about $1 \times 10^5$ cells per ml. The suspended cells were dispensed into culture vessels and incubated stationary at 36–37° C. to obtain confluent monolayer cell sheets. This process is termed cell passage. Cells that are serially passaged more than 50 times are cell strain.

HCV infected in the kidneys, the starting material of our method, was found to be capable of transfer from a generation to newer generations of the cell cultures and of persisting in cell strains. In addition, the change of the persisted virus into apathogenic nature was clearly demonstrated, by pig inoculation with the culture fluid harvested at various stages of the cell passages of cell strains. The result obtained in cell strain 1—1 and cell strain 3–2, established respectively from 2 infected pigs, is summarized in Table 1.

In cell strain 1—1, HCV harvested on the 40th or prior passages (cultivation day 375 or before) did not show any changes in its virulence. On the 66th passage (cultivation day 500), the virus was no longer lethal for pig. Reaction of a pig which received the virus was severe but it recovered and survived as a runt. Pigs inoculated with the virus harvested on the 80th passage (cultivation day 600) survived healthy without clinical symptoms. All the surviving pigs were resistant to challenge with a virulent HCV at $10^4$ MLD. The resistance was present 10 days after inoculation with the attenuated virus.

HCV persisted in cell strain 3–2 was not fatal to pigs on the 63rd passage (cultivation day 500). Reaction of pig to the virus was mild. On the 80th passage (cultivation day 600), the virus was apparently innocuous upon pigs. The surviving animals were resistant to $10^4$ MLD of a virulent HCV as early as 10 days after innoculation with the attenuated virus.

In contrast, HCV persisted in non-passaged monolayer cells which were maintained for at least 600 days by employing periodical medium changes was still lethal for pigs. These were cultures from which the carrier cell strains were established.

TABLE A.—THE REACTION OF PIGS TO HOG CHOLERA VIRUS HARVESTED AT VARIOUS STAGES OF SERIAL CELL PASSAGES OF THE VIRUS-CARRIER PIG KIDNEY MONOLAYER CELL STRAINS

| Cell strain designated | Passage level | Cultivation day | Virus titer | Pig No.[2] | Reaction of pigs to inoculum | Reaction of pigs to challenge |
|---|---|---|---|---|---|---|
| I-1 | 10 | 151 | [1] 2.75 | 4 | Death from hog cholera (9) [†] | |
| | 24 | 300 | 2.50 | 9 | Death from hot cholera (22) | |
| | 40 | 375 | 4.25 | 13 | Death from hog cholera (16) | |
| | 66 | 500 | 3.75 | 17 | Sick but recovered as runt | 5 wks. [‡] no reaction. |
| | 80 | 600 | 3.75 | 24 | Remained healthy | 2 wks., no reaction. |
| | 80 | 600 | 3.75 | 25 | ___do___ | 10 days, no reaction. |
| 3-2 | 20 | 200 | 5.00 | 6 | Death from hog cholera (11) | |
| | 35 | 300 | 1.50 | 11 | Death from hot cholera (27) | |
| | 44 | 350 | 2.83 | 15 | Death from hog cholera (37) | |
| | 63 | 500 | 5.00 | 19 | Survived with mild reaction | 3 wks., no reaction. |
| | 80 | 600 | 5.25 | 26 | Remained healthy | 2 wks., no reaction. |
| | 80 | 600 | 5.25 | 27 | ___do___ | 10 days, no reaction. |

[1] $Log_{10}$ $TCID_{50}$ virus titer per inoculum (1 ml), obtained by the END test.
[2] Yorkshire pig, free from HCV-antibody, 50–60 days of age.
[†] Days to death.
[‡] Period from virus inoculation to challenge.

Thus, it was evidenced that HCV persisted in cell cultures was attenuated with its immunogenicity by serial passages of the cells.

What we claim is:

1. In a method of attentuation of hog cholera virus in cells which have been suspended in a phosphatic buffered saline solution containing trypsin and pancreatin, the improvement which consists of the steps of
   (1) obtaining the cells to be suspended from the kidneys or other hog cholera virus supporting organs of an otherwise healthy, highly hog cholera virus susceptible, virus-infected pig free from hog cholera virus antibody, that has been inoculated with a virulent strain of standard challenge virus, said kidneys or other organs having been aseptically removed at the peak of infection, by mincing the kidney or other organs and suspending dispersed, in said buffer solution at 4° C.;
   (2) cultivation, by stationary incubation at 36 to 37° C., of the infected trypsin-dispersed cells in nutrient medium to obtain a primary monolayer cell sheet of passage 1 level infected cells;
   (3) dispersing the primary monolayer cell sheet in a phosphatic buffered saline solution containing 0.1% trypsin and 0.1% EDTA;
   (4) stationary incubation cultivation at 36–37° C. of the passage 1 level dispersed, infected cells of step 3 in a fresh nutrient medium, generating therein a new generation of infected cells to which the virus carries itself and in which the virus persists, and thereby obtaining a monolayer cell sheet of the second passage level;
   (5) repeating both of said dispersing steps in said dispersion solution and said fresh nutrient medium cultivation steps for 50 or more serial passage levels to attenuate the hog cholera virus until the virus is either apparently innocuous to pigs or the reaction of pigs to the virus is mild and the pigs inoculated with the attenuated virus are capable of withstanding a virulent virus challenge.

2. The method of claim 1 wherein the dispersing step and the cultivation step are each repeated for about 80 serial passage levels.

References Cited

UNITED STATES PATENTS

3,226,296  2/1965  Boynton _____ 424—89

OTHER REFERENCES

Youngner Proc. Soc. Exptl. Biol. and Med. 85(2); 202–205, February 1954.

Young et al., Amer. J. Vet. Res. 18: 466–472, July 1957.

Madin et al., Amer. J. Vet. Res. 18: 932–941, October 1957.

Shimizu et al., Derwent Basic No. 10,101, Derwent Pharmaceuticals Documentation Specification Book No. 147–148, pp. 93–97, Jan. 9, 1964.

Sato et al., Derwent Basic No. 13,737, Derwent Pharmaceuticals Documentation Specification Book No. 273–275, pp. 41–44, Oct. 8, 1964.

Soekawa et al., Veterinary Bulletin 35, page 29, abstract 176 (1965).

SHEP K. ROSE, Primary Examiner

U.S. Cl. X.R,
424—89